United States Patent
Yach et al.

(10) Patent No.: US 9,088,662 B2
(45) Date of Patent: Jul. 21, 2015

(54) SYSTEM AND METHOD FOR MANAGING FILE CATALOGS ON A WIRELESS HANDHELD DEVICE

(71) Applicant: BlackBerry Limited, Waterloo Ontario (CA)

(72) Inventors: David Paul Yach, Waterloo (CA); Mihal Lazaridis, Waterloo (CA); Andrew Douglas Bocking, Conestogo (CA); Arun Kumar, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 14/222,960

(22) Filed: Mar. 24, 2014

(65) Prior Publication Data
US 2014/0206337 A1    Jul. 24, 2014

Related U.S. Application Data

(63) Continuation of application No. 12/408,588, filed on Mar. 20, 2009, now Pat. No. 8,718,631.

(51) Int. Cl.
H04M 1/725    (2006.01)

(52) U.S. Cl.
CPC ...... *H04M 1/72525* (2013.01); *H04M 1/72558* (2013.01)

(58) Field of Classification Search
CPC . H04W 8/245; H04W 8/265; H04M 1/72525; H04M 2207/18; H04M 3/42178
See application file for complete search history.

(56) References Cited

U.S. PATENT DOCUMENTS

| | | | |
|---|---|---|---|
| 2002/0065074 A1* | 5/2002 | Cohn et al. | 455/422 |
| 2004/0117442 A1* | 6/2004 | Thielen | 709/203 |
| 2006/0041596 A1 | 2/2006 | Stirbu et al. | |
| 2008/0250431 A1 | 10/2008 | Lee et al. | 719/328 |
| 2009/0041439 A1 | 2/2009 | Miyamoto et al. | |
| 2010/0115254 A1* | 5/2010 | Deng et al. | 713/1 |

FOREIGN PATENT DOCUMENTS

EP    1686754 A1    8/2006

OTHER PUBLICATIONS

Extended European Search Report mailed Jun. 9, 2010, in corresponding application No. 09155675.3.
Partial Search report mailed Mar. 16, 2010, in corresponding application No. 09155675.3.
Examination Report mailed Jan. 23, 2012, in corresponding application No. 09155675.3.

(Continued)

*Primary Examiner* — Kashif Siddiqui
(74) *Attorney, Agent, or Firm* — Jon Gibbons; Fleit Gibbons Gutman Bongini & Bianco P.L.

(57) ABSTRACT

There is disclosed a method and system for managing file metadata stored in one or more catalogs on a wireless handheld device. In an embodiment, the method comprises: connecting to one or more file libraries stored remotely from the device; downloading to the device one or more catalogs storing file metadata for one or more file libraries stored remotely from the device; and remotely updating on the device the one or more catalogs such that the file metadata in one or more file libraries stored remotely from the device are substantially up-to-date on the device.

20 Claims, 8 Drawing Sheets

(56) References Cited

OTHER PUBLICATIONS

Summons to Attend Oral Proceedings Pursuant to Rule 115(1) EPC mailed Jun. 11, 2012, in corresponding application No. 09155675.3.

IN: TANENBAUM: "Modern Operating Systems", Feb. 21, 2001, Prentice Hall, New Jersey, USA, XP002570054 * p. 405, line 5—p. 406, line 11; figs. 6-16 * * p. 445, line 9—last line; figs. 6-39 * * p. 750, line 32—p. 752, line 12; figs.-10-37 * * p. 752, line 39—p. 753, line 15 *.

* cited by examiner

SYSTEM AND METHOD FOR MANAGING FILE CATALOGS ON A WIRELESS HANDHELD DEVICE

CROSS-REFERENCE TO RELATED APPLICATION

This application is a continuation of U.S. patent application Ser. No. 12/408,588, filed Mar. 20, 2009.

FIELD OF THE INVENTION

The present invention relates generally to wireless handheld devices, and more particularly to a system and method for managing media file catalogs on such devices.

BACKGROUND

Some wireless handheld devices may perform numerous functions including telephony, text messaging, wireless e-mail, Internet browsing, camera, multimedia player, etc. Often, these handheld devices have limited memory and storage capacity, restricting the number and/or size of files that may be stored on the devices at one time. Given these limited device resources, files stored on the handheld device need to be regularly managed by deleting some files from the device and adding other files onto the device as needed. The device may also need to be synchronized with a personal or host system from time to time in order to maintain up-to-date copies of files stored on the handheld device.

DETAILED DESCRIPTION

As noted above, the present invention relates to a system and method for managing file catalogs on a wireless handheld device.

Figure 1:
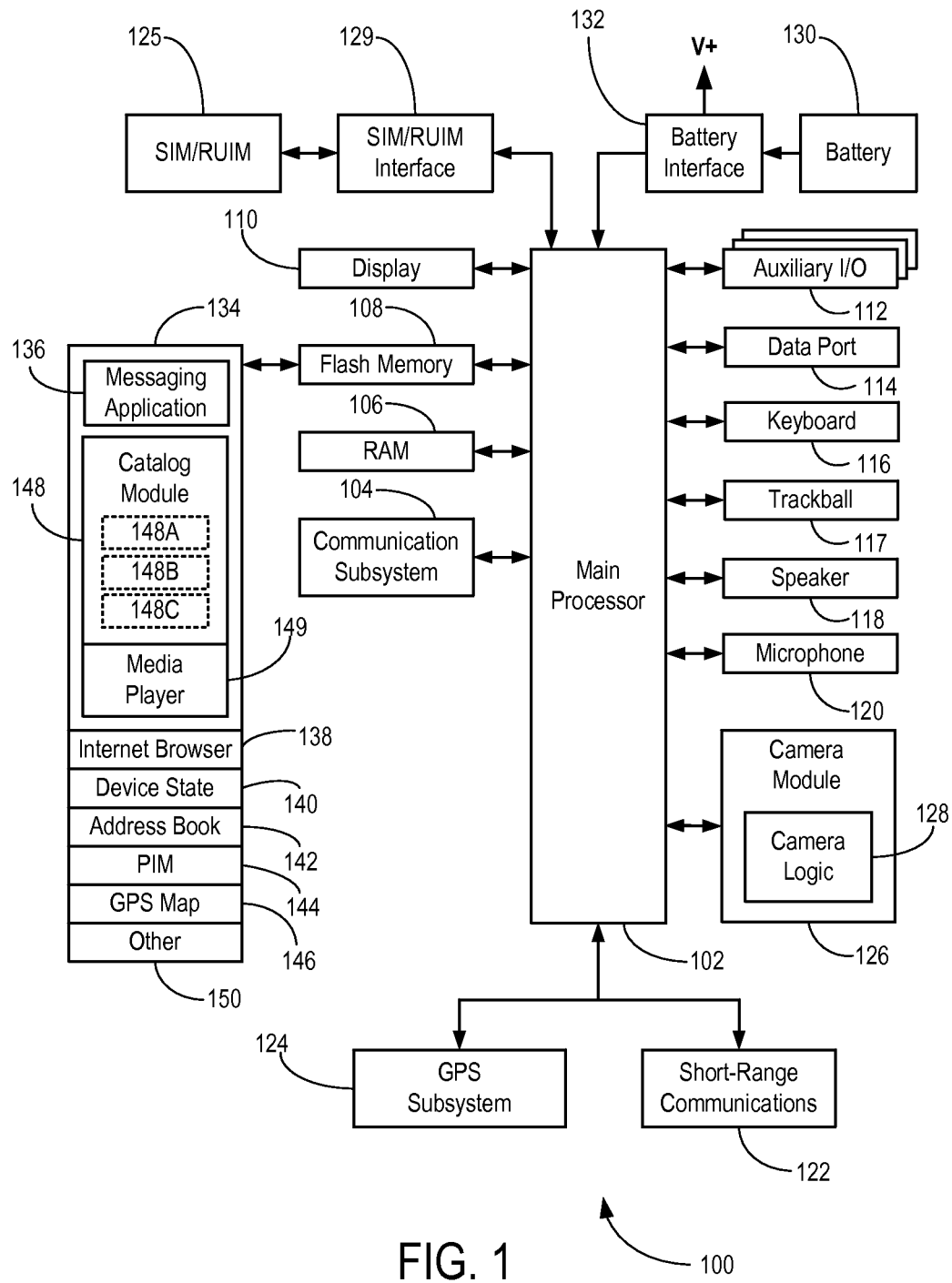
FIG. 1 is a schematic block diagram of various components of an illustrative handheld device.

In an illustrative embodiment, the invention may be practiced with a wireless handheld device in a wireless operating environment. Shown in FIG. 1 is a schematic block diagram of an illustrative wireless handheld device 100. The device 100 may comprise a number of components, including a main processor 102 which controls the overall operation of device 100. Communication functions, including data and voice communications, may be performed through a communication subsystem 104. The communication subsystem 104 may receive messages from and send messages to one or more wireless networks (not shown).

The main processor 102 may also interact with additional subsystems such as a random access memory (RAM) 106, a flash memory 108, a display 110, an auxiliary input/output (I/O) subsystem 112, a data port 114, a keyboard 116, a trackball 117, a speaker 118, a microphone 120, short-range communications 122, a GPS subsystem 124, a camera module 126, and associated camera logic 128.

Some of the subsystems of device 100 may perform communication-related functions, whereas other subsystems may provide "resident" or on-device functions. By way of example, the display 110 and the keyboard 116 may be used for both communication-related functions, such as entering a text message for transmission over a wireless network, and device-resident functions such as a calculator or task list. The trackball 117 may be used for various navigation functions, such as navigating through a graphical user interface (GUI) menu displayed on display 110. The trackball 117 may also be configured with a secondary actuation feature, such as allowing a user to depress the trackball, to allow selection of a highlighted item.

The GPS subsystem 124 may include a GPS antenna to receive signals transmitted by a minimum number of in-view GPS satellites required to acquire accurate latitude and longitude coordinates.

The camera module 126 may be adapted to capture an image through a lens onto a light sensitive image sensor such as a charge coupled device (CCD) sensor array or a complementary metal oxide semiconductor (CMOS) sensor array. The camera lens may be a fixed focus lens, or a variable focus lens with or without zoom features and controlled by camera logic 128 to focus an image onto the CCD or CMOS sensor array. Once captured by the CCD or CMOS sensor array, the image may then be processed by camera logic 128 into a suitable digital image file format such as Joint Photographic Experts Group (JPEG), Tagged-Image File Format (TIFF), Bit Mapping (BMP), different variations on these standard image file formats, or a vendor proprietary RAW image format. The image file may then be stored in available device storage such as flash memory 108, and displayed on display 110.

Still referring to FIG. 1, operating system software used by the main processor 102 is typically stored in a persistent store such as flash memory 108. Those skilled in the art will appreciate that the operating system, specific device applications, or parts thereof, may be temporarily loaded into a volatile store, such as the RAM 106, for processing by main processor 102.

The device 100 may send and receive communication signals over the wireless network after required network registration or activation procedures have been completed. Network access may be associated with a subscriber or user of the device 100.

The device 100 may be a battery-powered device and may include a battery interface 132 for receiving one or more rechargeable batteries 130. In some embodiments, the battery 130 may be a smart battery with an embedded microprocessor. The battery interface 132 is coupled to a regulator (not shown), which assists the battery 130 in providing power V+ to the device 100. The battery 130 may be used to power all components and modules in the device 100, including the camera module 126 and associated camera logic 128.

To identify a user, the communications device 100 may use a SIM/RUIM/USIM card 125 (i.e. Subscriber Identity Module or a Removable User Identity Module or a Universal Subscriber Identity Module, etc.), which is inserted into a SIM/RUIM/USIM interface 129, to communicate with a network. The SIM/RUIM/USIM card 125 is one type of a conventional "smart card" that can be used to identify a user of the communications device 100 and to personalize the communications device 100, among other things. Without the SIM/RUIM/USIM card 125, the communications device 100 may not be fully operational for communication with the wireless network 200, in some embodiments. By inserting the SIM/RUIM/USIM card 125 into the SIM/RUIM/USIM interface 129, a user can access subscribed services. Such subscribed services may include, for example, web browsing and messaging such as email, voice mail, SMS, and Multimedia Messaging Services (MMS).

The main processor 102, in addition to its operating system functions, enables execution of various software applications 134 on the device 100. A subset of software applications 134 that control basic device operations, including data and voice communication applications, will normally be installed on the device 100 during its manufacture.

The software applications 134 may include a messaging application 136. The messaging application 136 can be any suitable software program that allows a subscriber or user of the device 100 to send and receive wireless text communications. Various alternatives exist for the messaging application 136 as is well known to those skilled in the art. Messages that have been sent or received by the user are typically stored in local storage such as flash memory 108 of the device 100, or in some other suitable storage element in the device 100. In an alternative embodiment, some of the sent and received messages may be stored remotely from the device 100 such as in a data store of an associated host system that the device 100 communicates with. In an embodiment, the messaging application 136 may include a Message List user interface that is configured to allow a user to see a list of message objects (i.e. email messages) in a convenient list form. This will be described in detail further below.

The software applications 134 may also include a GPS map application 146 for providing geographic navigation, and location coordinates for geo-tagging objects. GPS map application 146 may be configured to operatively connect to GPS subsystem 124 to receive GPS latitude and longitude coordinates for a current position of the device 100. GPS map application 146 may also store scalable maps of various geographic regions in order to show the current position of device 100 on the map. As well, the GPS map application 146 may be configured to obtain latitude and longitude location coordinates by allowing a user to select a position on the GPS map.

Still referring to FIG. 1, device 100 may also include a catalog module 148 that may be operatively integrated with various other modules including a media player 149, Internet browser module 138, messaging application 136, address book module 142, GPS map module 146, etc. Catalog module 148 in cooperation with other components in device 100 may be adapted to provide various file cataloging functions as will be described in more detail further below. In an embodiment, catalog module 148 may include various file catalogs for cataloging various types of media, such as music 148A, videos 148B, and pictures 148C.

The device 100 may further include a device state module 140, an address book 142, a Personal Information Manager (PIM) 144, and various other modules 150. Additional software applications may also be loaded onto the device 100 through at least one of a wireless network via, the auxiliary I/O subsystem 112, the data port 114 (e.g. USB™), the short-range communications subsystem 122 (e.g. Bluetooth™, Wi-Fi™), or other device subsystem 124.

Figure 2:
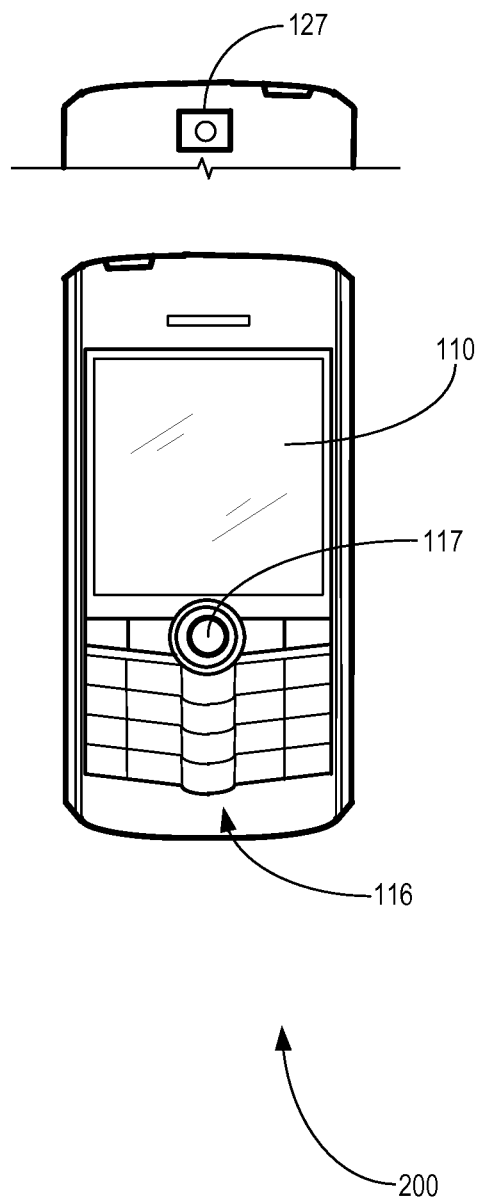
FIG. 2 is an illustrative front view of an illustrative embodiment of a handheld device including the various components as shown in FIG. 1.

Now referring to FIG. 2, shown is an illustrative embodiment of a handheld mobile device 200 that may provide a suitable operating environment. As shown, the device 200 may include a display 110, a keyboard 116, and other input or navigation means such as a trackball 117. The display 110 may be configured to display various screens allowing the user of device 200 to view screen outputs from the various software applications 134, including the image applications 148. Display 110 may also be configured to provide a touch-sensitive screen input in response to a prompt or query displayed on display 110. The device 200 may further include a camera lens that may be used to capture an image as described above with reference to FIG. 1. In an embodiment, the integrated camera 126 may provide a camera lens 127 on the back of the device 200, such that a user may use the display 110 as a camera viewfinder for framing an image.

Figure 3:
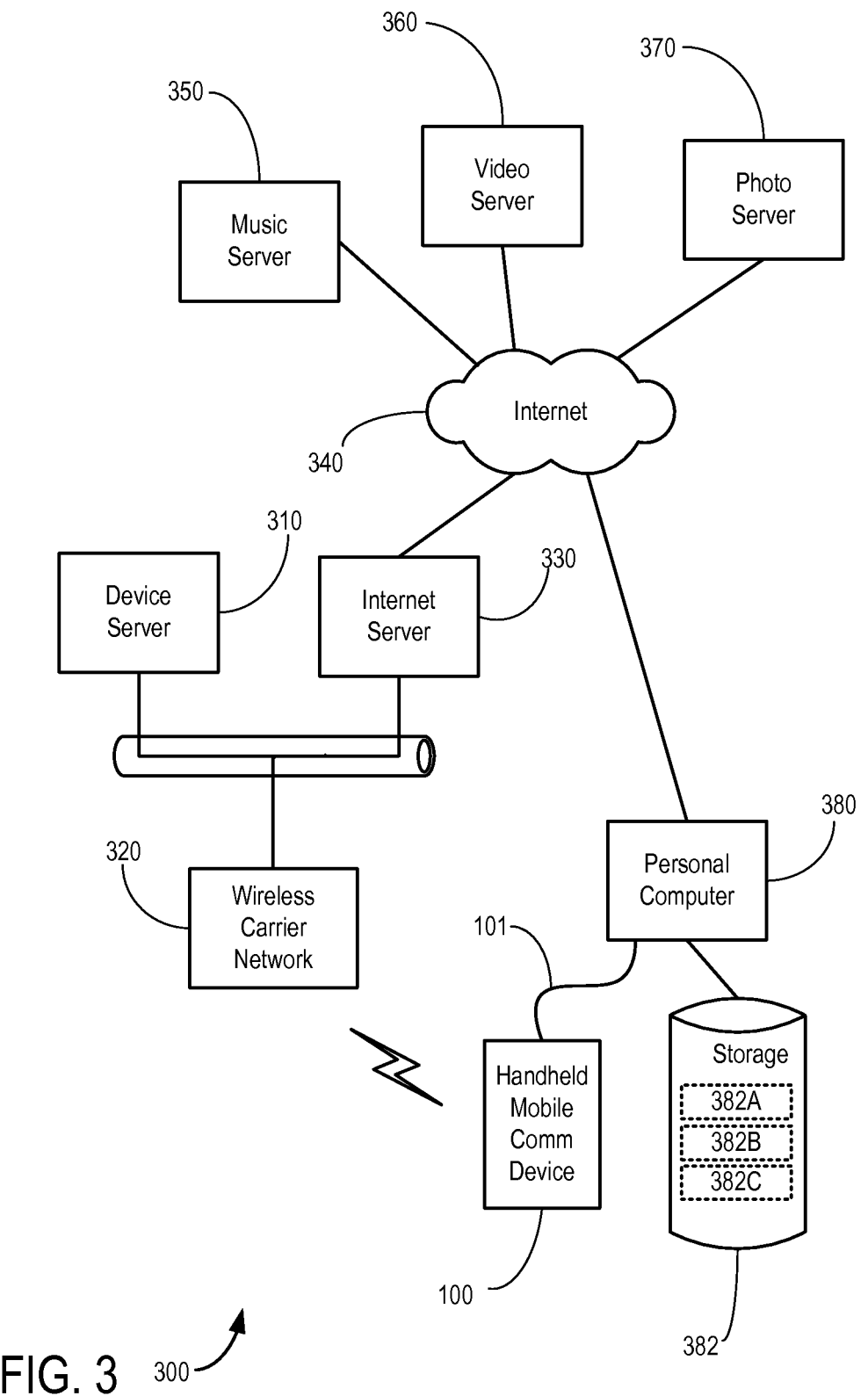
FIG. 3 is a schematic block diagram of a network environment in which the device of FIG. 1 and FIG. 2 may operate.

Now referring to FIG. 3, shown is a schematic block diagram of an illustrative communication network 300, which may provide a suitable operating environment. As shown, network 300 includes a device server 310 for hosting various server applications for device 100. Network 300 further includes a wireless carrier network 320 which provides wireless communications between device 100 and device server 310.

For the purposes of the present discussion, the phrase "connect to" means connected for the purposes of information exchange. Thus, two modules are "connected to" one another when information can move from one to the other. As will be described below, this connection may be made directly or indirectly, and by wired or wireless means. Thus, "connected to" is not to be construed as being limited to any mechanical or electrical connection, although such connections may facilitate the information exchange.

As well, for the purposes of the present discussion, "file metadata" means data related to a file but not the full content of the file. For example, a music file may have metadata associated with it including the song name, the artist name, the album name, its genre, the duration of the song, the number of times it has been played, etc. Similarly, a video file may have metadata associated with it including the filename, duration, format, the number of times it has been accessed, etc. A photo file may have metadata associated with it including filename, files size or resolution, the date the picture was taken, associated GPS location information, the number of times it has been viewed, etc.

Still referring to FIG. 3, network 300 also includes an Internet server 330 which provides a connection to the Internet 340. With a suitable Internet browser module 138 provided on device 100, device 100 may access the Internet 340 via the wireless carrier network 320, and the Internet server 330.

As shown in FIG. 3, Internet 340 may further include a number of servers, such as music server 350, video server 360, and photo server 370. Music server 350 may be, for example, a commercial music downloading service including a searchable music catalog, such as iTunes™. Video server 360 may be a commercial video server such as You Tube™, including a search engine for locating video titles or subjects of interest. Photo server 370 may be a shared image repository such as Flickr™, for example, which may also include a search engine for locating various types of images, either uploaded by a user of device 100 or by others. Music server 350, video server 360, and photo server 370 may also be non-commercial servers, simply providing online storage and access for various types of media files. However, access to certain media files on music server 350, video server 360, and photo server may be restricted to registered users who have accounts, or if certain access security parameters have been set.

Still referring to FIG. 3, device 100 may be connected to a personal computer 380 by wire, such as a USB cable 101 for example. Personal computer 380 may have a connected storage device 382 which may include one or more local media file libraries, such as a music library 382A, video library 382B, and photo library 382C. Music library 382A may be a small subset of music files that may be available from music server 350, but which have been paid for, downloaded, and saved locally on storage device 382.

Video library 382B may be a subset of video files downloaded from video server 360, or if video server 360 permits uploads, a subset of video files from video library 382B may be uploaded to video server 360 to be shared with other users on the Internet. Similarly, photo library 382C may include a subset of images downloaded from photo server 370, or photo server 370 may include a subset of images uploaded from photo library 382C to be shared with other users.

Figure 4A:
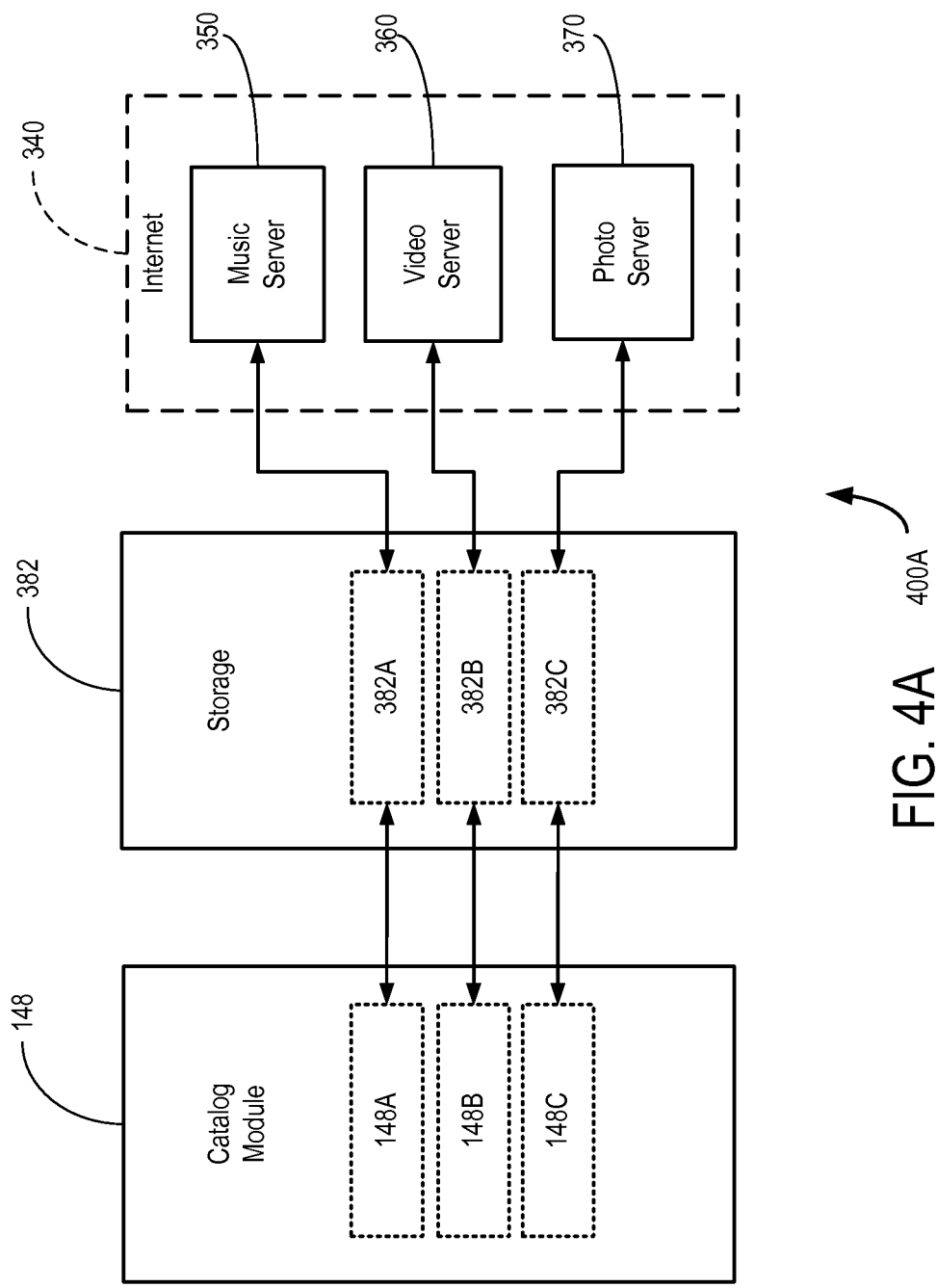
FIGS. 4A and 4B are schematic block diagrams of operative connections between a catalog module on the handheld device, personal storage, and network servers in accordance with an embodiment.

Now referring to FIG. 4A, shown is a schematic block diagram 400A of illustrative connections allowing an information flow between catalog module 148, storage device 382 of personal computer 380, and one or more media file servers 350, 360, 370 connected via the Internet 340. As noted earlier, the term "connections" should be interpreted broadly to mean any physical, electrical, wireless radio, or any other type of connection required for the information flow.

For the purposes of the present discussion, any libraries or servers not stored in device 100 will be considered "off the device" or stored remotely. For example, music library 382A, video library 382B, and photo library 382C are considered off the device and stored remotely. As well, music server 350, video server 360, and photo server 370 are also considered off the device and stored remotely.

As shown in FIG. 4A, in an embodiment, catalog module 148 or one of its submodules 148A, 148B, 148C may be adapted to be connected to various media libraries stored locally to personal computer 380 on storage device 382. For example, catalog module 148 may include a music catalog 148A adapted to connect to music library 382A, a video catalog 148B adapted to connect to video library 382B, and a photo catalog 148C adapted to connect to photo library 382C. Each of music catalog 148A, video catalog 148B, and a photo catalog 148C may be adapted to download to the device 100 file metadata for each of the music library 382A, video library 382A, and photo library 382C stored in personal computer 380. As will be explained further below, once downloaded to device 100, the file metadata stored in each of music catalog 148A, video catalog 148B, and a photo catalog 148C may be remotely updated such that the file metadata stored remotely from the device in music library 382A, video library 382A, and photo library 382C are substantially up-to-date in music catalog 148A, video catalog 148B, and a photo catalog 148C on the device. As noted above, music catalog 148A, video catalog 148B, and a photo catalog 148C are adapted to store file metadata, but not necessarily the full contents of each file. This will be explained in more detail below.

It will be appreciated that, in an alternative embodiment, each of these different types of media may be stored in the same catalog, but separate media catalogs will be described for the purposes of the present illustrative example.

Still referring to FIG. 4A, music library 382A, video library 382B, and photo library 382C may in turn be adapted to access and communicate with music server 350, video server 360, and photo server 370 via an Internet 340 connection from personal computer 380. For example, music library 382A may be adapted to access music server 350, via a media manager or player installed on personal computer 380, to download additional music files for local storage in music library 382A. In an embodiment, music library 382A maintains a searchable catalog of music files locally stored within music library 382A. Similarly, video library 382B maintains a searchable video catalog comprising video file names or corresponding descriptions. Photo library 382C may also have a searchable photo catalog comprising photo file names, or other searchable information such as dates, locations (if tagged using GPS coordinates for example), or other tags or descriptions such as names of people appearing in the photos. These searchable catalogs may be accessed via a common media manager application executing on personal computer 380, or possibly individually using different media applications.

In an embodiment, catalog module 148 is adapted to keep up-to-date catalogs storing file metadata for all media files stored in music library 382A, video library 382B, and photo library 382C on storage device 382. In an embodiment, catalog module 148 may be configured to check for updates to each of the catalogs created for music library 382A, video library 382B, and photo library 382C, for example whenever device 100 is connected locally by wire 101, or by a local wireless connection such as Bluetooth or Wi-Fi, to personal computer 380.

However, in a preferred embodiment, catalog module 148 is adapted to keep an up-to-date catalog of all file metadata for media files stored in music library 382A, video library 382B, and photo library 382C at all times, even when device 100 is not connected locally to personal computer 380. In this case, catalog module 148 on device 100 may access music library 382A, video library 382B, and photo library 382C on storage device 382 remotely via wireless carrier network 320 (through communication subsystem 102 of FIG. 1), and via Internet 340 connection to personal computer 380. Thus, any changes made to the catalogs for music library 382A, video library 382B, and photo library 382C may be updated remotely as long as device 100 has some form of access to network 300.

Various methods may be used to update the catalog module 148. For example, in an embodiment, catalog module 148 may be configured to periodically request an update from personal computer 380, either via scheduling or via user action to initiate the request. However, in another embodiment, updated catalog information may be pushed automatically to device 100 via device server 310 and wireless carrier network 320. For example, this may be done via messaging application 136 receiving a message from personal computer 380, or through Internet browser module 138 (FIG. 1) with Internet 340 access to personal computer 380.

Catalog module 148 on device 100 is thus adapted to provide a substantially up-to-date, fully searchable catalog storing file metadata for each of music library 382A, video library 382B, and photo library 382C at all times. Here, "substantially" up-to-date means that catalog module 148 may not have exactly the most current data for brief periods of time, such as when a change has been made in music library 382A for which an update has been sent, but not yet been received at device 100 (e.g. the device 100 may be temporarily out of service range, such as when the device is carried to an underground parking garage or a subway). However, given the limited storage space on device 100, in practice, only a small subset of the media files catalog in catalog module 148 may actually be stored on device 100 (e.g. in flash memory 108) at any one time. Thus, while catalog module 148 maintains a full catalog, it also maintains a record of which of the media files are currently locally stored on device 100.

In an embodiment, each catalog 148A, 148B, 148C of catalog module 148 may be adapted to be compatible with the database schema for each of music library 382A, video library 382B, and photo library 382C, respectively. For example, music catalog 148A may be configured to support the database schema of music library 382A, which in turn supports the database schema of music server 350. With a compatible database schema, music catalog 148A may be configured to conveniently receive catalog information created for music library 382A. This may include tags that have been created in the catalog for music library 382A including, for example, the number of times a song has been listened to, the songs that have been played recently, the rating given to each song, the genre of the song, etc.

In an embodiment, the compatible database schema between music catalog 148A and music library 382A may be used to automatically clean-up and synchronize files between device 100 and personal computer 380. For example, if some music files previously stored in music library 382A have been deleted, those music files may be deleted from device 100 if currently stored there. In an embodiment, catalog module 148 may perform this automatic clean-up or synchronization remotely via wireless carrier network 320. However, given the size of some media files, such automatic clean-up or synchronization may be easier for file deletions. For media file additions downloaded wireless to the device 100, a relatively fast wireless connection with high bandwidth may be necessary.

In another embodiment, catalog module 148 may be configured to automatically update device 100 based on user listening preferences. For example, catalog module 148 may maintain an access history which may track statistics of which media files have been accessed on device 100 via media player 149, and if the user consistently listens to certain artists or certain genres of music, catalog module 148 may be configured to automatically rotate music files from those genres each time device 100 is locally connected to personal computer 380. For example, if a user regularly listens to jazz, as evidenced by statistics recorded in the access history, device 100 may queue more music files having jazz as the genre when updating or rotating music files on device 100. The access history may also identify music files stored on device 100 that are rarely accessed or not at all. Suitable parameters may be set (e.g. not accessed for past 365 days) to delete these rarely accessed or never accessed files from the device 100 so that more storage space is made available for downloading one or more files from the one or more file libraries stored remotely from the device. However, even when a file is deleted from the device 100, the catalog information for that deleted file will remain in catalog module 148 if the file remains in one or more of the remotely stored libraries to which catalog module 148 is synchronized.

Figure 4B:
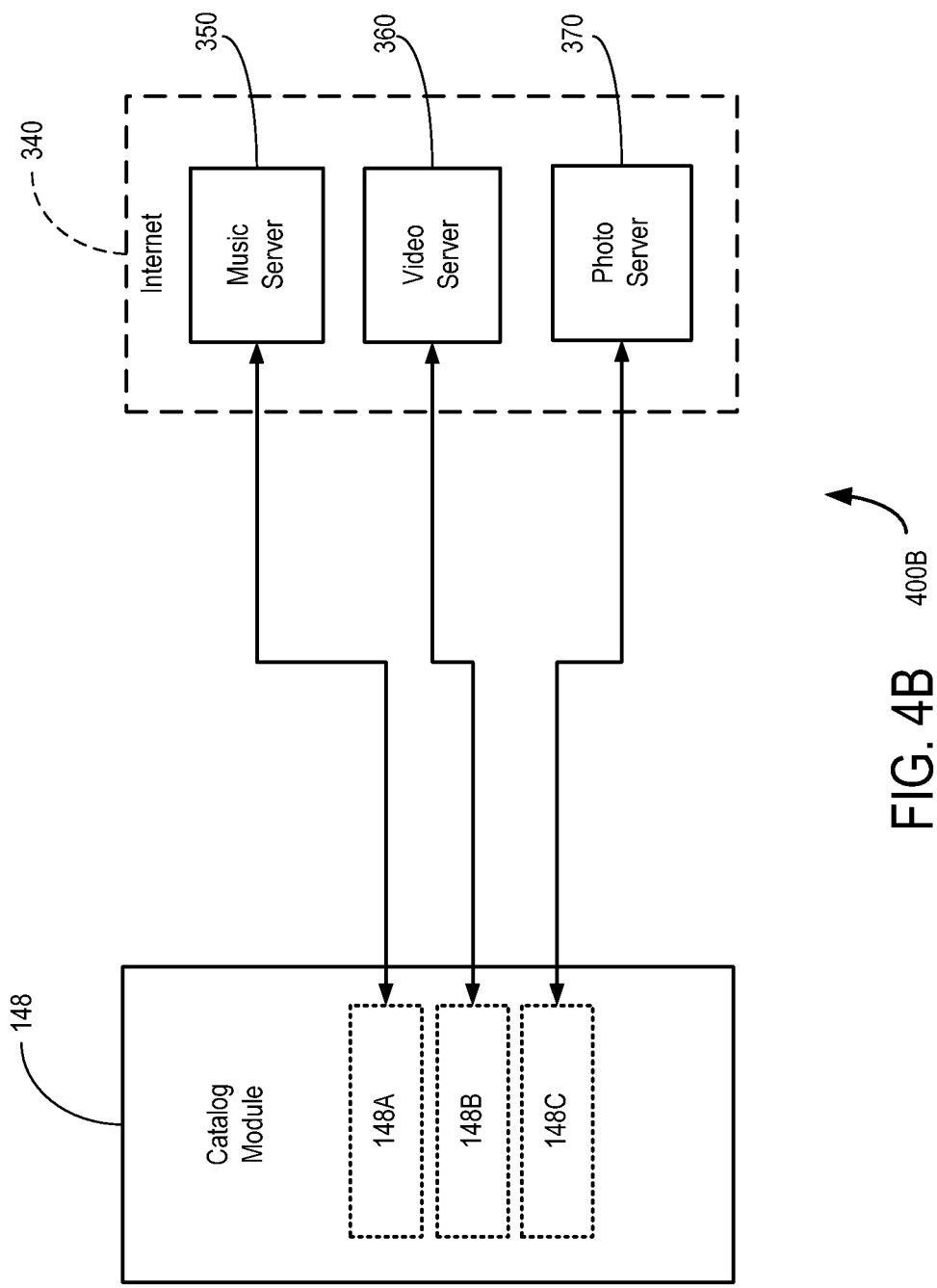

Now referring to FIG. 4B, in another embodiment, catalog module 148 may be configured to wirelessly connect to one or more media servers on the Internet, such as music server 350, video server 360, and photo server 370. Thus, rather than having personal computer 380 act as an intermediary, device 100 may directly access the library catalogs on these servers. In an embodiment, given sufficient memory provided on device 100, catalog module 148 may be configured to store up-to-date catalogs from one or more of music server 350, video server 360, and photo server 370. However, as each of music server 350, video server 360, and photo server 370 may contain millions of media files, it may not be practical for catalog module 148 to store even just the catalogs for every media file. In this case, catalog module 148 may store an up-to-date subcatalog for a useful subset of files. For example, music catalog 148A may store the current "Top 100" music downloads of a certain genre from music server 350, such that the current Top 100 is always available for searching from device 100. If the user wishes to have the Top 100 for several different genres of music, such as Pop, R&B and Soundtracks, multiple subcatalogs may be kept up to date by catalog module 148.

In an embodiment, catalog module 148 may be adapted to display, in a catalog listing of a remotely stored library, a flag or some other visual indication whether or not a file is currently stored on device 100. Thus, for example, when device 100 accesses a Top 100 catalog made available from music server 350, catalog module 148 may be able to quickly determine which Top 100 songs are already on the device 100. In addition, any files currently stored on device 100 may be listed separately in a "device catalog" of such files, as shown by example further below.

In an embodiment, catalog module 148 may be used to control which files the user wishes to delete or download to device 100, based on user preferences and based on available storage space on device 100 (e.g. space remaining on flash memory 108). Any edits made to catalog module 148, or requests for downloads of media files to the device 100, may be queued in a download queue, and synchronized with the personal computer 380 the next time there is a wireless/wired connection between the device 100 and personal computer 380. In this manner, effective control over music library 382A, video library 382B, and photo library 382C is available from device 100.

In an embodiment, catalog module 148 may be used to specify which files the user wishes to download from one or more of the music server 350, video server 360, and photo server 370 to personal computer 380. As catalog module 148 has complete catalog information for music library 382A, video library 382B, and photo library 382C on storage device 380, catalog module 148 therefore has the information necessary to determine which media files are not yet stored in music library 382A, video library 382B, and photo library 382C. Thus, media files which may be prohibitively large to download via wireless carrier network 320 may be scheduled instead for download to personal computer 380, e.g. via high speed cable or DSL modem. The next time device 100 is locally connected to personal computer 380, catalog module 148 may be synchronized and updated accordingly.

FIGS. 5A to 5D are illustrative user interface screens as may be displayed on device 100. As shown, in FIG. 5A, screen 500A shows a user interface for an illustrative music catalog 502. Music catalog 502 currently shows the contents of the "Device" catalog 504, including the number of songs, artists, albums, genres, and playlists, for example. Also shown in screen 500A are other catalogs on device 100, including an illustrative "Alen's Personal Computer" catalog 506, and an "Internet Music" catalog 508.

Figure 5A:
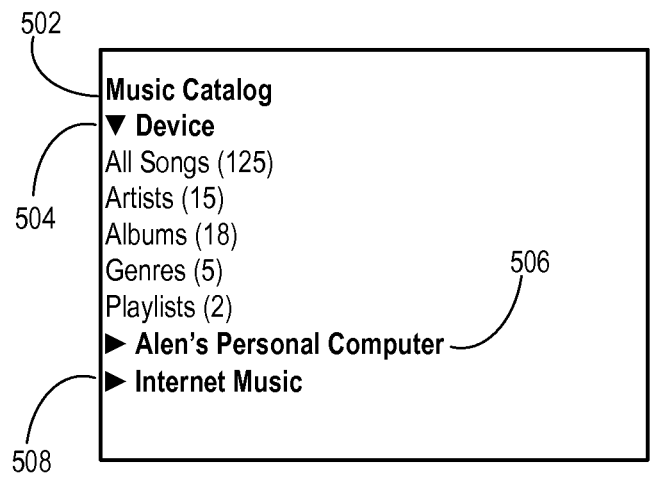
FIGS. 5A to 5D are illustrative user interface screens as may be displayed on the handheld device of FIG. 2.
Figure 5B:
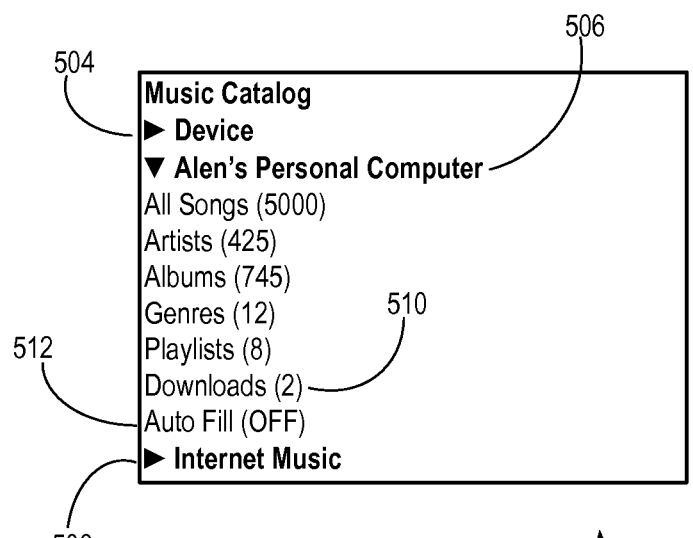

Now referring to FIG. 5B, shown is screen 500B in which the contents of device catalog 504 is collapsed, and instead the contents of Alen's Personal Computer catalog 506 are shown. As noted earlier, this catalog 506 on device 100 may store all of the file metadata for all music files actually stored on Alen's Personal Computer, but may store only a small fraction of the actual music files on device 100. Screen 500B also shows an illustrative "Downloads" option 510, and an illustrative "Auto Fill" option 512, which will be explained below.

Figure 5C:
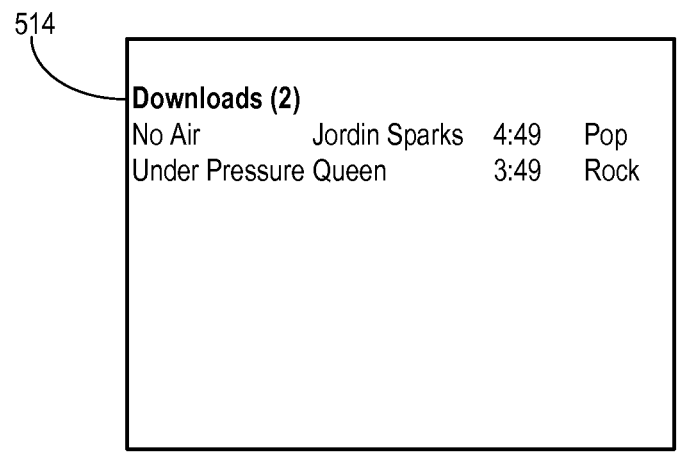
Figure 5D:
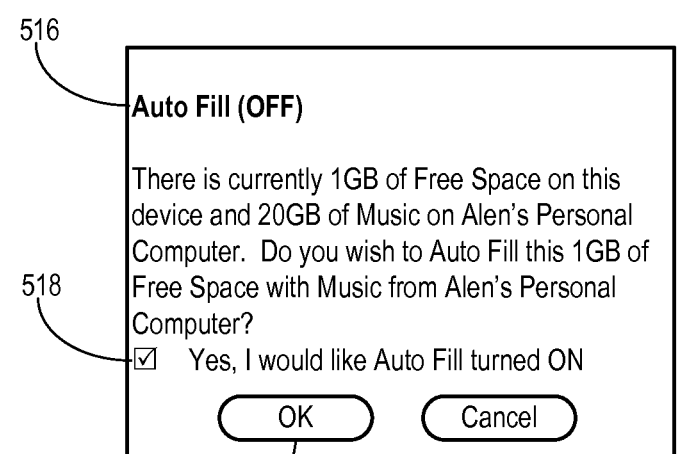

Now referring to FIG. 5C, shown is illustrative screen 500C, in which the "Downloads" option 510 has been selected to show the actual music files currently queued to download to device 100. While selection of music files for this download queue may be manual, as noted earlier, the music files may also be queued automatically based on the access history. FIG. 5D thus shows an illustrative "Auto Fill" option 514 which may be turned on upon selection of the Auto Fill option 512. Turning on Auto Fill may be confirmed by clicking OK at 516, or may be cancelled at 518.

Figure 6:
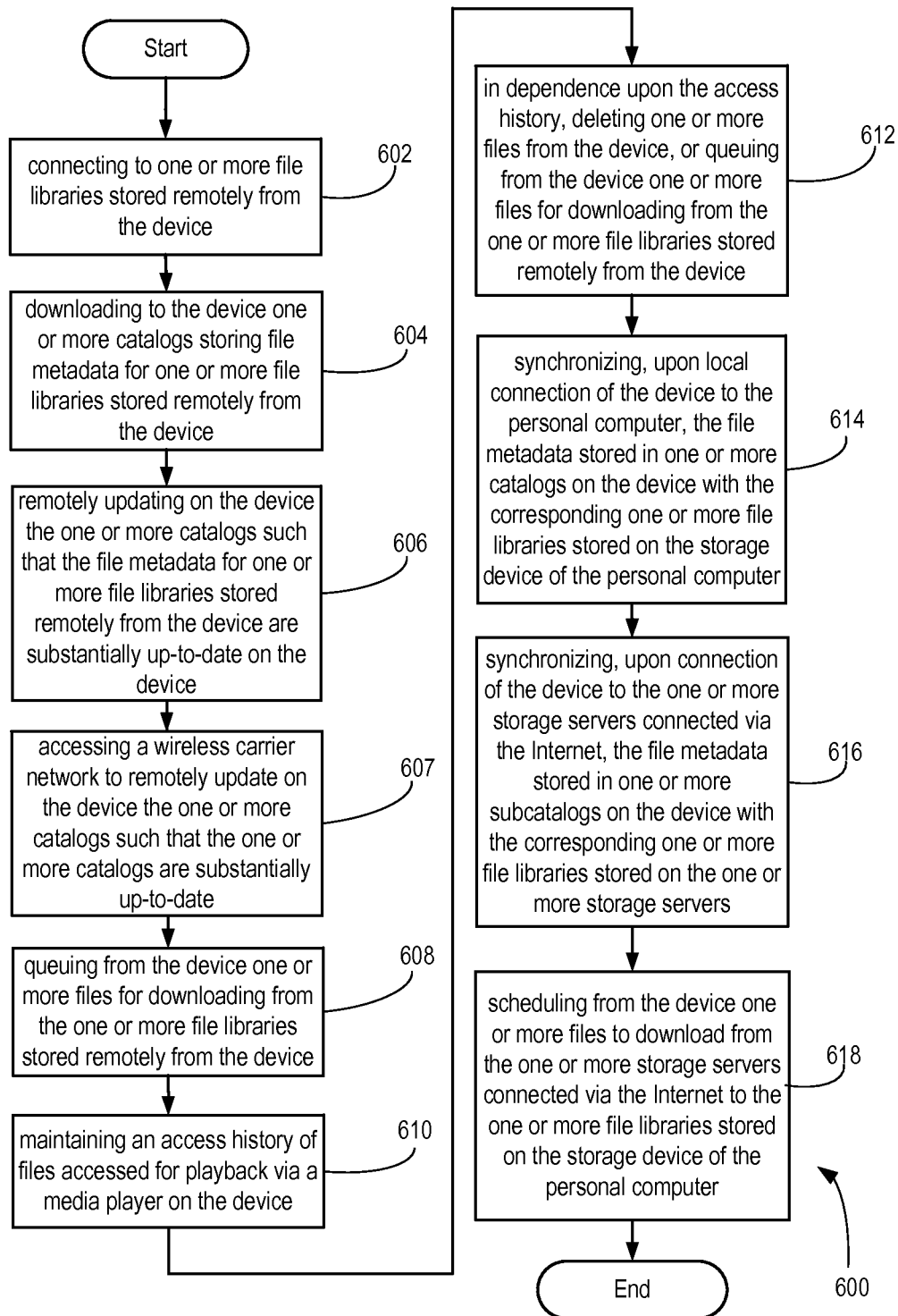
FIG. 6 is a schematic flow chart of a method in accordance with an embodiment.

Now referring to FIG. 6, shown is a schematic flow chart of a method of managing one or more file catalogs on a wireless handheld device in accordance with an embodiment. As shown, method 600 begins and at block 602, where method 600 connects to one or more file libraries stored remotely from the device.

Method 600 then proceeds to block 604, where method 600 downloads to the device one or more catalogs storing file metadata for one or more file libraries stored remotely from the device.

Method 600 then proceeds to block 606, where method 600 remotely updates on the device the one or more catalogs such that the metadata for one or more file libraries stored remotely from the device are substantially up-to-date on the device.

Method 600 then proceeds to block 607, where method 600 accesses a wireless carrier network to remotely update on the device the one or more catalogs such that the one or more catalogs are substantially up-to-date.

Method 600 then proceeds to block 608, where method 600 queues from the device one or more files for downloading from the one or more file libraries stored remotely from the device.

Method 600 then proceeds to block 610, where method 600 maintains an access history of files accessed for playback via a media player on the device.

Method 600 then proceeds to block 612 where, in dependence upon the access history, method 600 deletes one or more files from the device, or queuing from the device one or more files for downloading from the one or more file libraries stored remotely from the device.

Method 600 then proceeds to block 614, where the one or more file libraries stored remotely from the device are stored on a storage device of a personal computer, and the method 600 synchronizes, upon local connection of the device to the personal computer, the file metadata stored in one or more catalogs on the device with the corresponding one or more file libraries stored on the storage device of the personal computer.

Method 600 then proceeds to block 616, where the one or more file libraries stored remotely from the device are also stored on one or more storage servers connected via the Internet, and the method 600 synchronizes, upon connection of the device to the one or more storage servers connected via the Internet, the file metadata stored in one or more subcatalogs on the device with the corresponding one or more file libraries stored on the one or more storage servers.

Method 600 then proceeds to block 618, where method 600 schedules from the device one or more files to download from the one or more storage servers connected via the Internet to the one or more file libraries stored on the storage device of the personal computer. Method 600 then ends.

The techniques shown in FIG. 6, and as described generally in this disclosure, may be embodied as instructions carried by a data processor readable medium such as magnetic or optical tape or disk or read-only memory. The medium may include instructions that cause a processor, such as processor 102 in FIG. 1, to carry out the techniques shown in FIG. 6.

Thus, in an aspect, there is provided a method of managing file metadata stored in one or more catalogs on a wireless handheld device, comprising: connecting to one or more file libraries stored remotely from the device; downloading to the device one or more catalogs storing file metadata for one or more file libraries stored remotely from the device; and remotely updating on the device the one or more catalogs such that the file metadata for one or more file libraries stored remotely from the device are substantially up-to-date on the device.

In an embodiment, the method further comprises accessing a wireless carrier network to remotely update on the device the one or more catalogs such that the one or more catalogs are substantially up-to-date.

In another embodiment, the method further comprises queuing from the device one or more files for downloading from the one or more file libraries stored remotely from the device.

In another embodiment, the method further comprises: maintaining an access history of files accessed for playback via a media player on the device; and in dependence upon the access history, deleting one or more files from the device, or queuing from the device one or more files for downloading from the one or more file libraries stored remotely from the device.

In another embodiment, the one or more file libraries stored remotely from the device are stored on a storage device of a personal computer, and the method further comprises synchronizing, upon local connection of the device to the personal computer, the file metadata stored in one or more catalogs on the device with the corresponding one or more file libraries stored on the storage device of the personal computer.

In another embodiment, the one or more file libraries stored remotely from the device are also stored on one or more storage servers connected via the Internet, and the method further comprises synchronizing, upon connection of the device to the one or more storage servers connected via the Internet, the file metadata stored in one or more subcatalogs on the device with the corresponding one or more file libraries stored on the one or more storage servers.

In another embodiment, the method further comprises scheduling from the device one or more files to download from the one or more storage servers connected via the Internet to the one or more file libraries stored on the storage device of the personal computer.

In another aspect, there is provided a wireless handheld device for managing one or more file catalogs, the wireless handheld device adapted to: connect to one or more file libraries stored remotely from the device; to the device one or more catalogs storing file metadata for one or more file libraries stored remotely from the device; and remotely update on the device the one or more catalogs such that the file metadata for one or more file libraries stored remotely from the device are substantially up-to-date on the device.

In an embodiment, the device is further adapted to access a wireless carrier network to remotely update on the device the one or more catalogs such that the one or more catalogs are substantially up-to-date.

In another embodiment, the device is further adapted to queue from the device one or more files for downloading from the one or more file libraries stored remotely from the device.

In another embodiment, the device is further adapted to: maintain an access history of files accessed for playback via a media player on the device; and in dependence upon the access history, delete one or more files from the device, or queue from the device one or more files for downloading from the one or more file libraries stored remotely from the device.

In another embodiment, the one or more file libraries stored remotely from the device are stored on a storage device of a personal computer, and the device is further adapted to synchronize, upon local connection of the device to the personal computer, the file metadata stored in one or more catalogs on the device with the corresponding one or more file libraries stored on the storage device of the personal computer.

In another embodiment, the one or more file libraries stored remotely from the device are also stored on one or more storage servers connected via the Internet, and the device is further adapted to synchronize, upon connection of the device to the one or more storage servers connected via the Internet, the file metadata stored in one or more subcatalogs on the device with the corresponding one or more file libraries stored on the one or more storage servers.

In another embodiment, the device is further adapted to schedule from the device one or more files to download from the one or more storage servers connected via the Internet to the one or more file libraries stored on the storage device of the personal computer.

In another aspect, there is provided a data processor readable medium storing computer code that when loaded into a wireless handheld device adapts the device to manage file metadata stored in one or more file catalogs, the data processor readable medium comprising: code for connecting to one or more file libraries stored remotely from the device; code for downloading to the device one or more catalogs storing file metadata for one or more file libraries stored remotely from the device; and code for remotely updating on the device the one or more catalogs such that the metadata for one or more file libraries stored remotely from the device are substantially up-to-date on the device.

In an embodiment, the data processor readable medium further comprises code for accessing a wireless carrier network to remotely update on the device the one or more catalogs such that the one or more catalogs are substantially up-to-date.

In another embodiment, the data processor readable medium further comprises code for queuing from the device one or more files for downloading from the one or more file libraries stored remotely from the device.

In another embodiment, the data processor readable medium further comprises: code for maintaining an access history of files accessed for playback via a media player on the device; and code for deleting one or more files from the device, or queuing from the device one or more files for downloading from the one or more file libraries stored remotely from the device, in dependence upon the access history.

In another embodiment, the one or more file libraries stored remotely from the device are stored on a storage device of a personal computer, and the data processor readable medium further comprises code for synchronizing, upon local connection of the device to the personal computer, the file metadata stored in one or more catalogs on the device with the corresponding one or more file libraries stored on the storage device of the personal computer.

In an embodiment, the one or more file libraries stored remotely from the device are also stored on one or more storage servers connected via the Internet, and the data processor readable medium further comprises code for synchronizing, upon connection of the device to the one or more storage servers connected via the Internet, the file metadata stored in one or more subcatalogs on the device with the corresponding one or more file libraries stored on the one or more storage servers.

In an embodiment, the data processor readable medium further comprises code for scheduling from the device one or more files to download from the one or more storage servers connected via the Internet to the one or more file libraries stored on the storage device of the personal computer.

While illustrative embodiments have been described above, it will be appreciated that various changes and modifications may be made. More generally, the scope of the invention is defined by the following claims.

What is claimed is:

1. In a communication device storing media files and a catalog based upon a library stored on a remote storage device, the library including duplicate media files, a method comprising:
    tracking media file access statistics of which media files have been accessed on the communication device;
    creating tags in the catalog, the tags based upon the tracking of the media file access statistics; and
    synchronizing the catalog including the tags with the library, thereby communicating the media file access statistics of the communication device to the remote storage device.

2. The method of claim 1 wherein the media file access statistics include at least one of
    a number of times a media file has been accessed,
    media files that have been recently accessed,
    a rating given to each media file, and
    a genre of the media file.

3. The method of claim 1 wherein the tags are included within metadata associated with the media files and the synchronizing synchronizes the metadata.

4. The method of claim 1 further for managing data using the communication device, the communication device having a display, the display presenting a list of file metadata corresponding to the catalog, the catalog being dynamically updated at the remote storage device, the method further comprising:
    receiving the list from the remote storage device;
    presenting the list on the display;
    identifying whether media files corresponding to the file metadata are stored on the communication device;
    displaying a visual indicator within the list to identify the media files stored on the communication device;
    creating a download queue if the media files associated with the file metadata are not stored on the communication device; and
    communicating with the remote storage device to download the media files identified in the download queue.

5. The method of claim 4 further comprising periodically initiating communication with the remote storage device to receive the list of file metadata corresponding to the dynamically updated catalog.

6. In a system comprising a communication device and a remote storage device, the communication device storing media files and a catalog based upon a library stored on the remote storage device, the library including duplicate media files, the communication device comprising:
    a media player configured to track media file access statistics of which media files have been accessed on the communication device;
    a catalog module configured to create tags in the catalog, the tags based upon the tracking of the media file access statistics; and
    a processor configured to synchronize the catalog including the tags with the library, thereby communicating the media file access statistics of the communication device to the remote storage device, the remote storage device comprising
    the library coupled to the processor and configured to synchronize the catalog including the tags with the library, thereby receiving the media file access statistics of the communication device.

7. The system of claim 6 wherein the media file access statistics include at least one of
- a number of times a media file has been accessed,
- media files that have been recently accessed,
- a rating given to each media file, and
- a genre of the media file.

8. The system of claim 6 wherein the tags are included within metadata associated with the media files and the synchronizing synchronizes the metadata.

9. The system of claim 6 further for managing data using the communication device, the communication device having a display, the display presenting a list of file metadata corresponding to the catalog, the catalog being dynamically updated at the remote storage device, the communication device comprising
- a display configured to present a list of the file metadata, and
- the processor is further configured to cause the communication device to:
  - receive the list from the remote storage device;
  - present the list on the display;
  - identify whether the media files corresponding to the file metadata are stored on the communication device;
  - display a visual indicator within the list to identify the media files stored on the communication device;
  - create a download queue if the media files associated with the file metadata are not stored on the communication device; and
  - communicate with the remote storage device to download the media files identified on the download queue.

10. The system of claim 9 wherein the media files include at least one of a music file, a video file, and a photo files.

11. A method of managing media files using a communication device, the method comprising:
- synchronizing a catalog of media files included within a remote storage server having restricted media files with a file library included within a library having acquired media files;
- receiving a selection of a selected media file for downloading;
- scheduling a download of the selected media file from the library having the acquired media files to the communication device based upon the selected media file being included in the file library; and
- scheduling a download of the selected media file from the remote storage server having restricted media files to the communication device based upon the selected media file not being included in the file library.

12. The method according to claim 11 wherein the scheduling the download of the selected media file from the remote storage server having restricted media files further comprises acquiring the selected media file.

13. The method according to claim 12 wherein acquiring the selected media file includes paying for the selected media file.

14. The method according to claim 11 wherein the file library is stored on the remote storage server.

15. The method according to claim 11 wherein the file library is stored on a personal computer.

16. The method according to claim 11 wherein the selection of the selected media file corresponds to a manual selection.

17. The method according to claim 11 wherein the selected media file was previously deleted.

18. The method according to claim 11 wherein the communication device has a display, the display presenting a list of file metadata corresponding to the catalog, the catalog being dynamically updated at the remote storage server, the method comprising:
- receiving the list from the remote storage server;
- presenting the list on the display;
- identifying whether media files corresponding to the file metadata are stored on the communication device;
- displaying a visual indicator within the list to identify the media files stored on the communication device; and
- creating a download queue including the selected media file if the media files associated with the file metadata are not stored on the communication device, wherein
- the scheduling the download of the selected media file from the remote storage server having restricted media files to the communication device based upon the selected media file not being included in the file library includes communicating with the remote storage server to download the media files identified in the download queue, and
- the scheduling the download of the selected media file from the library having acquired media files to the communication device based upon the selected media file being included in the file library includes communicating with the library to download the media files identified in the download queue.

19. The method of claim 18, further comprising:
- generating an access history of the media files stored on the communication device; and
- performing an action based on the access history of the media files.

20. The method of claim 18 further comprising periodically initiating communication with the remote storage server to receive the list of file metadata corresponding to the dynamically updated catalog.

\* \* \* \* \*